United States Patent [19]
Marshall et al.

[11] 3,737,851
[45] June 5, 1973

[54] PRECISION VEHICLE INTERVAL DETECTION AND SIGNALING SYSTEM

[75] Inventors: Arthur N. Marshall; James W. Rinehart; Charles A. Gregory, Jr., all of Richmond, Va.

[73] Assignee: Traffic Safety Systems, Inc., Richmond, Va.

[22] Filed: Apr. 1, 1971

[21] Appl. No.: 130,382

[52] U.S. Cl. ............................. 340/104 R, 340/31 R
[51] Int. Cl. .............................................. G08q 1/09
[58] Field of Search ............... 340/31 R, 38 R, 104 R

[56] References Cited
UNITED STATES PATENTS

| | | | |
|---|---|---|---|
| 3,046,519 | 7/1962 | Polster | 340/31 X |
| 3,508,191 | 4/1970 | Barker | 340/31 X |
| 3,536,900 | 10/1970 | Iwamoto | 340/31 A |
| 3,544,958 | 12/1970 | Carey | 340/38 P |
| 3,588,805 | 6/1971 | Davin | 340/31 |

*Primary Examiner*—Harold I. Pitts
*Attorney*—Richard G. Wynne

[57] ABSTRACT

A beam of radiant energy, such as from an infrared transmitter, is directed in a path, preferably downwardly, across the center of a traffic lane to impinge upon an appropriate photoelectric receiver or other detector so that a vehicle interrupts the beam path as it travels along the traffic lane. As the vehicle moves on out of the beam path, the beam again impinges on the receiver to produce an output indicating passage of the rear of a vehicle to actuate a first timing delay circuit that produces a minimum timing interval, such as 0.2 seconds. Timing delay circuits defining longer unsafe and/or illegal headway intervals between the rear of one vehicle and the front of a following vehicle are then actuated at the conclusion of this minimum interval to generate a signal from the system indicating unsafe or illegal "tailgating" conditions if the beam is again interrupted within these defined intervals. However, if the beam is prematurely interrupted during the minimum interval defined by the first timing delay circuit, the system is prevented from responding to indicate arrival of another vehicle or to signal an unsafe or illegal headway interval between vehicles.

14 Claims, 7 Drawing Figures

Patented June 5, 1973

INVENTORS
ARTHUR N. MARSHALL
JAMES W. RINEHART
CHARLES A. GREGORY, Jr.

BY Richard G. Wynne
ATTORNEY

INVENTORS
ARTHUR N. MARSHALL
JAMES W. RINEHART
CHARLES A. GREGORY, JR.
BY Richard G. Wynne
ATTORNEY

PRECISION VEHICLE INTERVAL DETECTION AND SIGNALING SYSTEM

BACKGROUND OF THE INVENTION

1. Field of the Invention

This invention relates to systems for detecting potentially unsafe or illegal headway interval traffic conditions caused by one vehicle following another too closely, or "tailgating" as it is popularly termed, and more particularly to a system of this type capable of precisely detecting intervals between the rear of one vehicle and the front of the following vehicle without responding to gaps or separations between tandem portions of the same vehicle.

2. Background of the Invention

Although tailgating is recognized by most traffic safety authorities as a major cause of automobile accidents, particularly rear end collisions that result in heavy property damage and serious "whiplash" type injuries, the practical difficulties of identifying all but the most flagrant violations have heretofore prevented any direct attack of the problem. The major difficulty is probably due to the fact that many motorists form the unsafe habit of following the vehicle in front too closely simply because of their inability to properly correlate speed and distance factors determinative of safe driving intervals. Such motorists seem incapable of properly estimating what constitutes a safe headway interval at various speeds without repetitive practical experience which previously could only be provided by close personal supervision.

As described in one applicant's copending patent application, Ser. No. 714,214 filed Mar. 19, 1968 now U.S. Pat. No. 3,618,003, and entitled "VEHICLE INTERVAL DETECTION AND SIGNALING SYSTEM", a system may be provided for detecting and signaling unsafe or illegal conditions when one vehicle follows another too closely or tailgates. Such systems have great value to those involved in traffic safety as a convenient means of studying this serious traffic problem and educating the motorist as to what constitutes a safe headway interval.

The aforementioned application provides a system which precisely identifies and records the tailgating violation. The data obtained is of sufficient preciseness and dependability to provide the required evidence in court for upholding a tailgating ticket.

The instant invention is directed to an additional feature. Trailer-trucks of certain types have significant space between the trailer and its truck. Multiple trailers are often used and some of them present a series of significant spaces to the system.

Not only should passage of the front and rear of a vehicle be detected with precision, but erroneous responses to gaps between portions of the same vehicle should be avoided. Such precision, as provided in the aforementioned copending application, can be achieved with optical or similar type sensors that direct a beam along a path from a transmitter to a receiver to be interrupted by the passing vehicle. With such arrangements, the beam must be properly oriented to insure that even with great variations in vehicle shape and size, the actual front end and rear of the vehicle are being sensed.

But, in some instances, the beam would also pass through gaps between towing and towed vehicles to impinge on the receiver causing it to generate outputs erroneously indicating passage of the rear of a vehicle followed quickly by another beam interruption indicating arrival of the front of another. A similar response might also result from stray reflections of the beam to the receiver and also from noise signals. If an erroneous response in such cases can be eliminated, the value of the system both for law enforcement and for traffic study and motorist education can be greatly enhanced.

SUMMARY OF THE INVENTION

Basically, the improved system of this invention employs a beam type sensor with a narrow beam of radiant energy, such as infrared, directed in a path from a transmitter to a receiver to intersect the path of the vehicles traveling in a selected traffic lane. Vehicles traveling along the traffic lane interrupt the path of the beam to the receiver commencing with the arrival of the front end and ceasing with the passage of the back end so that the output signal from the receiver indicates whether or not a vehicle is present at a specific point in the traffic lane to interrupt the beam. The receiver output signal is coupled to the logic and timing circuitry that has separate timing delay circuits for defining fixed time intervals definitive of unsafe or illegal tailgating or headway interval conditions. These fixed time intervals are initiated as a rear of a vehicle passes out of the path of the beam allowing it to again reach a receiver. If the beam is thereafter interrupted by the front end of a following vehicle before the end of the fixed time interval that is initiated upon sensing of the rear of the previous vehicle, the system records and/or signals the existence of an unsafe or illegal headway interval condition so as to warn the motorist or permit enforcement of the law.

To prevent erroneous indications of unsafe or illegal conditions where the path is momentarily reestablished through a gap between a towing and towed portions of the same vehicle, a first timing delay circuit defines a minimum timing interval, for example 0.2 seconds, during which the remainder of the system is prevented from responding to indicate arrival of another vehicle or to signal an unsafe or illegal headway interval. Therefore, if the beam is prematurely interrupted within the minimum time interval after being reestablished, the system responds by canceling continuation of the fixed timing intervals and initiating them again upon the next reestablishment of the beam path indicative of the rear of a vehicle.

In the preferred embodiment, an infrared transmitter mounted in an elevated position adjacent or above the roadway, such as on a utility pole, directs a beam downwardly towards a point near the center of the traffic lane. An infrared receiver unit having a photodetector element selectively sensitive to the particular infrared radiations from the transmitter may be installed in the roadway at this point under a protective transparent cover. A focusing and shielding arrangement is employed in the receiver to limit its response only to infrared energy eminating from the direction of the transmitter.

In the preferred embodiment described herein, the logic and timing functions of the system are perfomed in a manner that permits advantageous use of standarized integrated circuit and printed circuit board techniques to achieve ease of manufacture and maintenance. In particular, maximum use is made of integrated NOR circuits both in an input latching circuit and in providing a number of standarized delay circuits for performing both timing and logical functions.

In the preferred circuit arrangement in accordance with the invention, a conventional photodetector circuit having photoresisitive elements sensitive to the infrared radiation from the transmitter generates an amplified output signal indicative of whether or not the beam from the transmitter impinges on the receiver. The photodetector output signal controls the logic to one of two alternate positions in accordance with the presence or absence of a vehicle in the path of the beam. The logic provides complementary True and False logic level signals to opposing inputs of an input latching circuit that includes a flip-flop arrangement for positively indicating proper logic levels and timing for signals to other circuits in the system. The logic level outputs from this input circuit are supplied to the inputs of a first timing delay circuit having a pair of NOR logic gates cross connected to provide bistable operation. In its quiescent state, this bistable circuit is maintained in a Reset state and is switched to its Set state when an appropriate signal indicative of the passing of the rear of a vehicle is applied to its Set input from the input latching circuit. This signal is derived by differentiating the change in signal level produced when the rear of a vehicle passing the receiver allows the beam to again reach the receiver. As the bistable arrangement is switched to its Set state, a timing circuit initiates the minimum timing interval, typically 0.2 seconds. If the beam is again interrupted by presence of a vehicle during this interval, a signal is applied from the input latching circuit to return the bistable to its Reset state. If not, the minimum timing interval cycle is completed, at which time the bistable is returned to its Reset state by a signal from the delay circuit, and an output is applied to the Set inputs of another pair of similar timing delay circuits and is delivered to complete the operation of a total vehicle counter that records the total number of vehicles passing in the traffic lane.

The output generated at the end of the minimum timing interval by the first timing delay circuit is differentiated at the input to both of the additional timing delay circuits to place them both in their Set state. Each then initiates a different timing interval delay before generating a signal to return the respective bistable to its Reset state, provided that a signal from the input circuit indicating arrival of the front of another vehicle is not applied to its Reset input prior to expiration of its timing interval. If such a reset signal indicating arrival of another vehicle is received before the timing interval is completed, an output pulse is generated to actuate devices for recording and/or signaling the existence of an unsafe or illegal interval between vehicles. In the preferred form of this system, a delay interval of approximately 0.5 seconds is added to the initial 0.2 second interval delay circuit to define an illegal interval between vehicles, whereas a delay of 1.0 second is added to the 0.2 second interval delay circuit to define an unsafe interval, with the total delay including the initial 0.2 second interval, being 0.7 seconds and 1.2 seconds respectively.

In the particular form of the invention illustrated and described herein, indications of the illegal or dangerous conditions, such as by flashing a sign or employing an audible warning, may be controlled by further timing delay circuits responsive to the outputs indicative of these conditions. In such an arrangement, actuation of the further timing delay circuit for indicating an illegal condition is used to reset the timing delay circuit indicative merely of a dangerous condition so that both are not indicated simultaneously.

DETAILED DESCRIPTION

Figure 1:
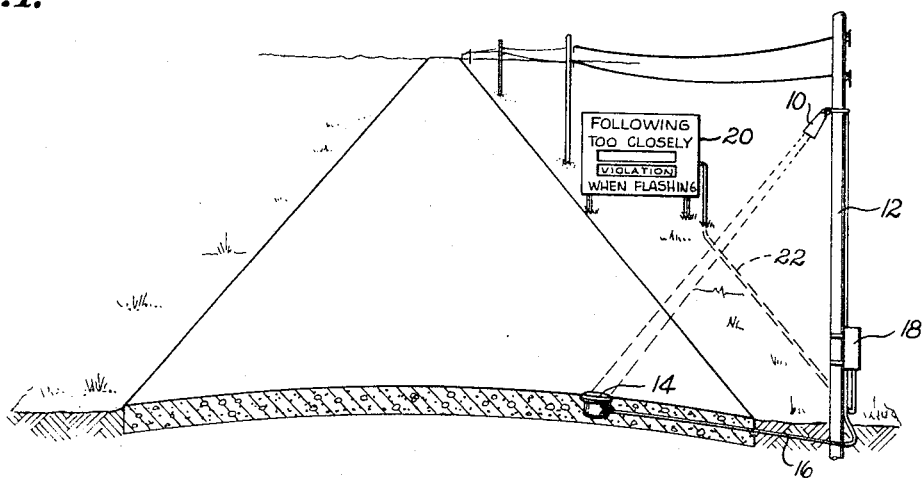
FIG. 1 shows a one lane installation of the system.

Referring now to FIG. 1, which shows an installation of the system of the invention for one traffic lane of a two lane thoroughfare, an infrared transmitter 10 is mounted in an elevated position on a convenient utility pole 12 typically located alongside such roads. On modern highways and freeways, such transmitters can conveniently be mounted on overhead light standards, sign supports or overpass structures in a position directly above the traffic lanes.

Figure 2:
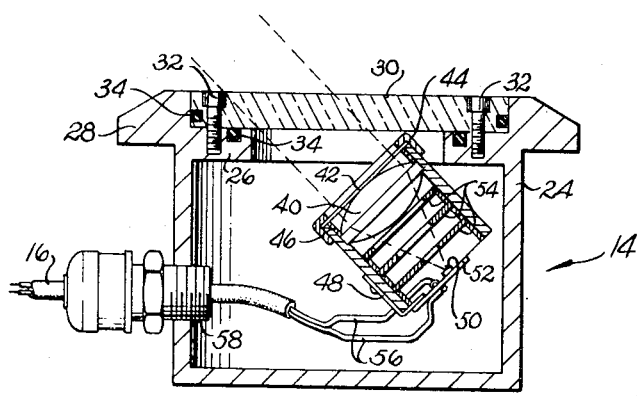
FIG. 2 illustrates one view of the receiver.
Figure 3:
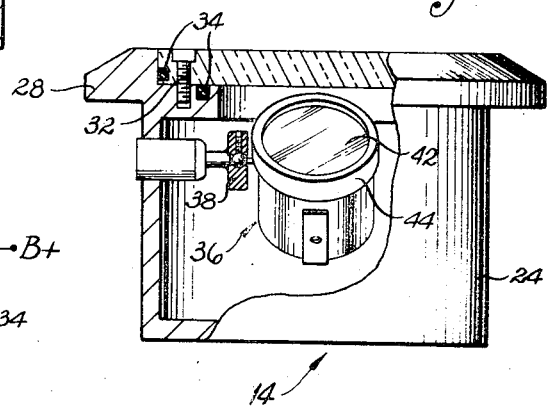
FIG. 3 is another view of the receiver.

A receiver unit 14, as more particularly shown and described in connection with FIGS. 2 and 3, is embedded in the road with its flat upper surface flush with the adjacent road surface and exposed to be impinged upon by the beam from the transmitter 10. Alternatively, where embedding of a detector unit may be impractical or desirable, a thin flat reflector plate or the like may be affixed to the road surface with the transmitter 10 and the receiver 14 located so that the beam is reflected between them. For best results, the transmitter 10 and receiver 14 should be placed so that the beam path is at a right angle with the normal direction of vehicle travel and with a point approximately three feet above the center line of the roadway, with the relative locations selected to provide a steep downward beam angle to impinge on the flat transparent cover on the receiver 14 and thus avoid excessive reflection from its upper surface such as might prevent a sufficient amount of the beam energy from reaching the photodetector element within the receiver 14. An underground cable 16 electrically couples the receiver 14 to a control box 18 containing most of the system electronics, which may conveniently also be mounted on the utility pole 12. Electrical power for operating the transmitter 10 is coupled thereto from the control box 18 and operating power for the entire system can be obtained from an available AC power line or a self-contained portable power supply (not shown). If desired, a warning sign 20 may be erected alongside or over the roadway in a suitable position to be easily seen by a motorist in a vehicle with its front end over the receiver position. The power and control signals for operating the sign 20 may be coupled thereto from the control box 18 by means of an underground cable 22. The sign unit 20 may also include an audible signal such as a horn or siren for attracting the motorist's attention.

Referring now to FIGS. 2 and 3, we show a preferred construction for a receiver unit 14 to be embedded in the roadway, the functional elements of the receiver 14 are enclosed within a protective housing 24 with a closed lower end and an open upper end surrounded by inner and outer supporting flanges 26 and 28. As shown in FIG. 2, the outer supporting flange 28 has a flat under surface for supporting the housing on the underlying road surfacing material and a beveled upper surface to extend just below the road surface with the covering material holding the unit down to maintain its top flush with the road. A transparent cover plate 30 of Plexiglas or the like is supported on the inner flange 26 and held in place by screws 32. Compressible O-ring seals 34 contained in grooves around the outer periphery of the cover plate 30 and adjacent the inner edge of the inner flange 26 provide a water and air tight closure preventing the entry of water or other troublesome materials such as dust. A photodetector unit 36 is mounted within the exterior housing 24 on a ball joint type swivel mounting 38 which permits it to be rotated in a vertical plane towards a desired alignment with a beam from the transmitter 10 and then locked in position with the set screw or the like. The photodetector unit 36 has a hollow cylindrical casing in which is mounted a focusing lens 40 with its optical axis coincident with the central axis of the cylinder. The upper surface of the lens is protected and covered by a flat disk shaped infrared filter 42 supported around its inner edge on the adjacent end surface of the cylindrical casing against which it is held by the inwardly extending rims surrounding the large central opening in a retainer cap 44 with internal threads for engaging external threads on the casing or being otherwise held in place thereon. The circumferential edges of the focusing lens 40 are supported on the lower side in contact with an interior shoulder formed within the housing and on the upper side by an annular lens retainer sleeve 46. An L-shaped bracket 48 affixed to the outer surface of the housing extends inwardly across the opening at the opposite or lower end of the casing to support a small photodetector element 50 mounted on an insulative backing member 52 along the central axis of the cylinder and the optical axis of the lens 40 substantially at its focus point. A series of flat annular optical baffles 54 with central openings of decreasing diameter concentric with and spaced along the interior of the cylindrical casing to define a cone shaped optical path for the focused beam from the transmitter 10 with its apex coinciding with the sensitive surface of the photodetector element 50. Connecting wire leads 56 are soldered or otherwise electrically connected to the photodetector element 50 and are coupled through a cable plug 58 extending through the wall of the receiver casing 14 and through the underground cable 16 to the control box 18.

Figure 4:
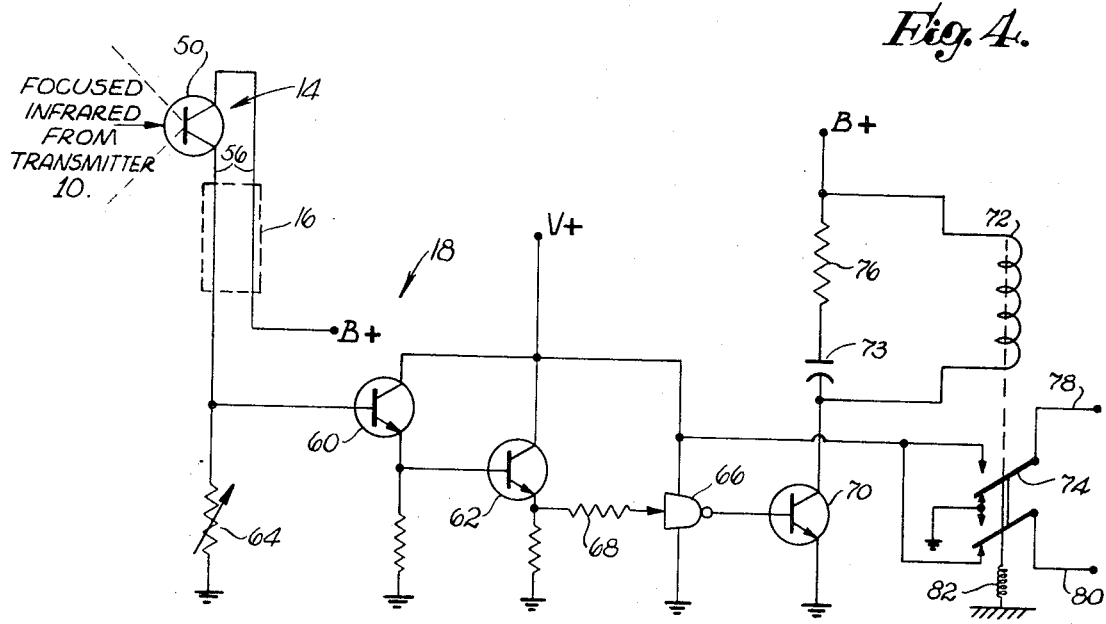
FIG. 4 illustrates the photo-detector circuit.

Referring now to FIG. 4, which illustrates schematically a photodetector circuit such as may be employed in the preferred form of this invention, the photodetector element 50 is the only circuit element contained within the receiver unit 14, its opposing terminals being connected by the leads 56 through the cable 16 to the remaining circuitry and power supply sources at a remote location within control box 18. In this case, the photodetector element 50 consists of a phototransistor providing a photoresistive response to the infrared energy focused thereon from the transmitter 10. For example, the transmitter 10 may be of the conventional type that has a collimating lens or reflector projecting radiant energy generated by an incandescent lamp in a narrow beam, like a spotlight, through a planar filter material that removes the visible light portion of the spectrum to permit only the invisible infrared to be directed outwards towards the receiver. Such transmitters are readily available with various suitable units being widely used in conventional infrared detection systems for industrial use and need not be described in further detail herein.

In such an arrangement, the phototransistor, preferably of the type sold under the designation LS 600 by Texas Instruments Inc. or the like, has its collector terminal coupled to a B+ voltage supply (typically a positive 24 volts) provided for the control box circuitry while its emitter terminal is coupled to the base of a first NPN transistor 60 connected in a common collector, two stage emitter follower configuration with another NPN transistor 62. The common collectors of these transistors 60 and 62 are both coupled to a V+ power supply (typically 4.5 volts), which corresponds to the positive True logic level employed with the gating circuitry. The emitter of the phototransistor 50 is also connected to ground or common potential through a high valued variable resistor 64 having a maximum resistance typically in the order of 1 megohm.

In this instance, the two stage emitter follower arrangment of the transistors 60 and 62 operates as a switch to provide a high input impedance for the signal from the phototransistor 50 and a low output impedance for the input to a NOR logic gate 66. Without the focused infrared energy from the source impinging on the phototransistor element 50, the resistance between its collector and emitter is quite high. The high impedance of the phototransistor 50 is coupled in series with that of the variable resistor 64 providing a voltage divider for the B+ supply. The common terminal between the divider elements 50 and 64 is coupled as an input to the two stage emitter follower. With the receiver unit installed for operation, the variable resistor 64 is adjusted, using worse case conditions, to maintain the level of the input signal applied to the base of the transistor 60 just below the level required for collector cutoff with the focused infrared beam not impinging on the phototransistor element 50, while on the other hand providing a voltage level sufficient to saturate the second stage transistor 62 when the focused infrared energy is present. With the transistor 62 conducting in saturation in response to the infrared energy impinging on the phototransistor 50, to indicate absence of a vehicle, the V+ collector supply voltage is applied with a slight drop through a resistor 68 as a True logic level to the input of the NOR logic gate 66, which in this case functions merely as an inverter for this signal to generate a False level at its output.

With the True logic level at its input, the False level output of the NOR logic gate 66, typically at ground or zero volts, is applied to the base of an NPN switching transistor 70 having its emitter terminal coupled directly to ground or common potential. The collector of the transistor 70 is coupled through a relay actuating coil 72 to the B+ supply with a capacitor 73 in series with a resistor 76 coupled in parallel with the coil. The coil 72 operates two ganged movable switch contacts of a relay arrangement 74 to either of two alternative positions, thus applying the V+ True logic level from opposing fixed switch contacts to either one of two output lines 78 or 80 and the zero False logic level to the other. The ganged movable contacts are biased to the downward position, as shown in FIG. 4, as by a spring 82, and are actuated to the upper contact position only when actuating current flows through the relay coil 72, to produce an upward force overcoming the bias as happens when the infrared beam is interrupted during the presence of a vehicle. In that event, the collector to emitter impedance of the phototransistor 50 is high, thus lowering the input voltage at the base of the transistor 60 to cut it and transistor 62 off. This delivers a False logic level to the input of the NOR gate 66, to produce a True level at its output to be applied to the base of the switching transistor 70 causing it to conduct in saturation. Actuating current flows through the relay coil 72 moving the contacts to the upper position to reverse the logic levels on the output leads 78 and 80.

Figure 5:
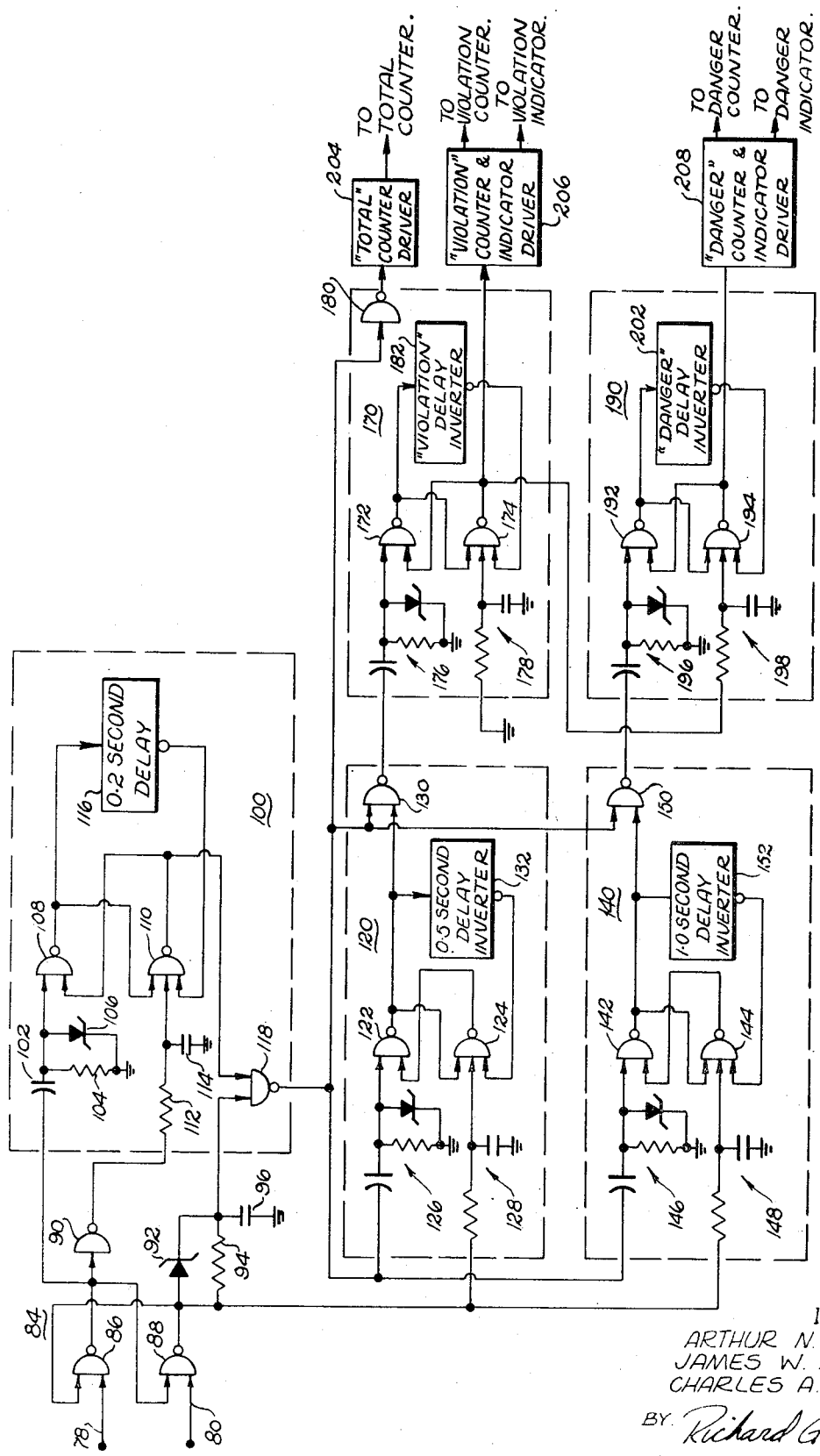
FIG. 5 shows the logic and timing circuitry.

Referring now to FIG. 5, which illustrates one form of logic and timing circuitry employed in the present invention, the complementary True and False logic levels produced by operation of the switching arrangement 74 on the output lines 78 and 80 are applied as inputs to an input circuit arrangement 84. This circuit insures positive indication of contact switching and provides proper logic level and timing of signals needed for proper operation of the other circuits in the system. A first pair of NOR logic gates 86 and 88 are cross coupled to operate as a conventional flip-flop with the output of each coupled as an input to the other.

All of the NOR circuits employed are preferably of the integrated type, each formed on a monolithic silicon chip substrate using planar techniques and having at least a three input capability. Such a NOR circuit component is the dual NOR gate presently available from Signetics Corporation of Sunnyvale, Calif., under the designation SU315. Of course, it should be understood that the basic logic and timing functions employed in the invention may be implemented through the use of other types of basic logic gates and arrangements, such as those employing the more common AND and OR logic, as will be apparent to those skilled in logic design.

When the absence of a vehicle is detected, or spurious signals occur during passage of a vehicle to erroneously indicate absence of a vehicle, the movable contacts of the relay switching arrangement 74 are in the normal downward position to apply a True logic level on line 80 to the input of the NOR gate 88 and a False logic level on line 78 to the input of the NOR gate 86. During absence of a vehicle, the True input at the NOR gate 88 generates a False level at its output that is coupled to the input of the other cross connected NOR gate 86, which also receives the False input on the line 80, thus producing a True output from the NOR gate 86. This is applied through the cross coupling to the input of the NOR gate 88 to maintain its output False, thus latching the flip-flop arrangement in this Reset condition. The output from the NOR logic gate 86 is coupled directly to a Set input of a first timing delay circuit 100, and also as an input through an additional NOR logic gate 90 operating as an inverter with its output coupled to a Reset input of this first timing delay circuit. The output of NOR gate 88 is applied directly to the Reset inputs of other timing and delay circuits, as hereinafter described, and also through a unidirectional delay circuit consisting of a diode 92 for passing the positive polarity True signals without delay and of an RC delay network with a resistor 94 and a capacitor 96 for delaying the negative going pulse edge when the output from the NOR circuit 88 changes from a True to a False level, as upon the passing of the rear edge of a vehicle.

Of course, in many cases it might be preferable to combine the input circuit 84 with the photodetector circuit of FIG. 4 to eliminate the relay switching arrangement 74 with its merely redundant logic function which does give the assurance of positive switching. In that case, assuming choice of proper voltage levels, the output of NOR gate 66 would be coupled directly to line 80 as an input to NOR gate 86, and the collector of transistor 70 with direct resistance coupling to B+ eliminating capacitor 73 or relay 72 connected directly to line 78 as a complementary input to NOR gate 88.

The first timing delay circuit 100 is substantially identical to each of the others, as hereinafter described, except for certain parameters of the timing circuitry determining the delay interval. In the timing delay circuit 100, the Set input applied from the NOR gate 86 is applied through a differentiating circuit consisting of a series capacitor 102 and a resistor 104 connected to ground. A Zener diode 106, or other appropriate voltage limiter arrangement, coupled in parallel with the resistor 104 limits the maximum positive level of the differentiated signal to the proper True logic level, in this case 4.5 volts, to be applied to one input of a NOR logic gate 108. This NOR gate 108 is cross connected in a flip-flop arrangement with another NOR logic gate 110. When a positive going signal is produced at the output of the NOR gate 86 in the input circuit 84, only then is a positive True logic level applied to the input of NOR gate 108. The inverted logic level produced at the Reset input from the output of the NOR gate 90 is applied through an RC delay circuit consisting of a resistor 112 and a capacitor 114 as one of three inputs to the other flip-flop NOR gate 110. In addition, the output from the NOR gate 108 is coupled directly as an input to the other NOR gate 110 and also indirectly through a delay inverter circuit 116 providing a minimum delay interval, in this instance 0.2 seconds, as a separate input. The output of the NOR gate 110 is cross coupled as an input to the NOR gate 108, and also is applied as an input to an output NOR gate 118 having the selectively delayed output signal from the NOR gate 88 of the input circuit 84 applied to its other input.

In operation, the first timing delay circuit 100 receives input signals generated by the input circuit 84 to generate at the output from the output NOR gate 118 a signal that is normally at the positive True level in the absence of a vehicle and switches to the False level upon detection of the trailing edge of a vehicle or the equivalent condition. The output from NOR gate 118 remains at the False level during the entire 0.2 second minimum delay interval returning to a True level upon its completion, provided that presence of a vehicle is not sensed during that period. On the other hand, if the beam is interrupted by a vehicle or otherwise during the 0.2 second minimum delay interval, the output of NOR gate 118 still remains at the False level, but the first timing delay circuit 100 is returned to its original quiescent state to begin another timing cycle upon detection of the trailing edge.

Initially, with no vehicle present and the first timing delay circuit 100 in its quiescent state, the True level on the input lead 80 of the input circuit 84 and the False level on the input lead 78 result in a False output from the NOR gate 88 and a True output from the NOR gate 86. This applies a True level from the output of NOR gate 86 to the Set input of the timing delay circuit 100, a False input from the NOR GATE 90 to its Reset input, and a False input from the NOR gate 88 to one input of the output NOR gate 118.

When the presence of a vehicle is first detected, the state of the flip-flop arrangement with cross coupled NOR circuits 108 and 110 remains the same, but the normal True output from the output NOR gate 118 is switched to a False level. First of all, the state of the input circuit is changed to its Set condition. The input to the NOR gate 86 on the input lead 78 is switched to a True level, while the True level previously existing on the input lead 80 to the NOR gate 88 switches to the False level. The False output of the NOR gate 86, upon being applied to the other input of the NOR gate 88 through the cross connection, maintains the flip-flop arrangement of input circuit 84 in its Set condition. In the Set condition, the False output from the NOR gate 86 is applied to the Set input of the timing delay circuit 100, and since the signal is negative going from the positive True to the zero False level, only a negative pulse is produced by differentiating circuit to be applied to the input of the NOR gate 108. This has no effect since this input was previously False. Also, the True output from the NOR gate 90 is applied to the Reset input and reaches the input of the NOR gate 110 with a slight delay. Since the output of the NOR gate 110 was already False, due to the True input from the output of the NOR gate 108, it simply remains in this condition. However, the True level now produced from the output of the NOR gate 88 is applied through the bypass diode 92 without a delay to the input of the output NOR gate 118, causing its output to immediately switch from a True to a False level, which is applied to the Set inputs of additional timing delay circuits in the system.

Subsequently, when the absence of a vehicle is again detected, indicating passage of its trailing edge, the line 80 returns to a True level and the line 78 to a False level thus producing a False output signal from the NOR gate 88 to be applied through the delay circuit components 94 and 96 with a slight delay to the input of the output NOR gate 118. The False output from NOR gate 88 is applied also through the cross coupling to the input of the NOR gate 86 causing its output to assume its normal True level. This provides a positive going signal to the Set input of the first timing delay circuit 100 to place it in its Set condition and initiate a 0.2 second delay timing cycle.

As the Set input of circuit 100 is returned to the True level upon passage of the trailing edge of a vehicle, the voltage at the input of NOR gate 108 rises to the positive True level only momentarily, since only the positive going leading edge is passed by the capacitor 102 of the differentiating circuit with the input to the NOR gate 108 quickly returning to a zero False level. Since the circuit 100 is in the quiescent state, the other input to the NOR gate 108 from the output of the cross connected NOR gate 110 was also at the False level resulting in a True output from NOR gate 108, which is then applied back to the input of the NOR gate 110 to hold its output at the False level to maintain the flip-flop in a Reset condition. Since the False output from the NOR gate 110 is also applied to the output NOR gate 118 and because its other input is also at the False level, a True signal level results at its output. At the same time, the True level from the NOR gate 86 is inverted by NOR gate 90 to provide a False level with a slight delay to the input of the NOR gate.

Since the input from the 0.2 second delay inverter is also normally False, and the output from the cross connected NOR gate 108 is also now False, NOR gate 110 produces a True output to be applied through the cross coupling to the input of the NOR gate 108 to hold the flip-flop arrangement in the Set condition. At the same time, the True output now generated by NOR circuit 110 is coupled to an input of the output NOR gate 118 maintains its output at the False level as the prior True level from NOR gate 88 is removed. The delay of the False level signal from the output of NOR gate 88, which is slightly longer than that of the Reset input provided by the resistor 112 and capacitor 114, permits the True output of the NOR gate 110 to be applied to the input of the output NOR gate 118 before the True level previously applied to the other input is removed, thus maintaining the False output level from NOR gate 118 constant without interruption into the delay interval.

The False level now assumed by the output from the NOR gate 108 is applied to the 0.2 second delay inverter 116, which in the quiescent state has a normal False level output, as more fully described in connection with FIG. 6. After the 0.2 second minimum delay interval, the delay inverter 116 switches its output from a normal False level to a True level. Its True level output is then applied to the input of the NOR gate 110, which switches its output to a False level, which when applied to the input of NOR gate 108 causes its output to return to its True level and at the same time is applied to the input of the output NOR gate 118 causing its output to return to its True level.

A pair of timing delay circuits 120 and 140 receive operating inputs from the outputs of the input 84 and the first timing delay circuit 100. Both of these timing delay circuits 120 and 140 are composed of basic components essentially identical to those employed in the first timing delay circuit 100 except for minor changes in connections in component areas, and therefore need not be described in detail. Both have a pair of NOR gates 122 and 124 for the circuit 120 and 142 and 144 for the circuit 140, cross coupled in a flip-flop arrangement, with differentiator limiter circuits 126 and 146 at the Set input to permit only positive going pulse edges to be applied as a True input level to one input of the respective NOR gates 122 and 124 and a short interval R-C delay 128 and 148 at the Reset input for slightly delaying the application of Reset pulses to one input of the respective other NOR gate 124 or 144. Each also have an output NOR gate 130 and 150, respectively, each corresponding to the output NOR gate 118 in the first timing delay circuit 100, but each having one of its inputs coupled to receive the output from the respective NOR gates 122 and 142 that receive the Set inputs, rather than those that receive the Reset inputs, as in the first timing delay circuit 100. In this way, these output NOR gates 130 and 150 remain conditioned to generate a True level upon arrival of a vehicle during the respective delay interval cycle, as contrasted with the operation of the NOR gate 118 in the circuit 100 which is disabled for its respective delay interval cycle by receiving the output from its Reset connected NOR gate 110.

The timing delay circuit 120 is used to define an illegal headway interval between the rear of one vehicle and the front of a following vehicle, the existence of which would make the motorist in the following vehicle liable to a traffic citation for illegal tailgating or reckless driving. The timing delay circuit 140 on the other hand defines a longer unsafe interval between vehicles not illegal, but which might be used to educate or warn drivers against tailgating practices. In accordance with the preferred embodiment of this invention, these unsafe and illegal intervals are defined by adding the short interval provided by the first timing delay circuit 100 to the subsequent timing delay intervals provided by the circuits 120 and 140. In the case of the illegal interval provided by the circuit 120, a delay interval cycle of 0.5 second is provided by a delay inverter 132 to be combined with the 0.2 second cycle of the delay inverter 116 to yield a total interval of 0.7 second which corresponds with standards being adopted by most traffic regulatory agencies. In the case of the unsafe interval timing delay circuit 140, a delay of 1.0 second cycle interval is provided by a delay inverter 152 to be combined with the 0.2 second delay of the circuit 100 for a total of 1.2 seconds, which corresponds roughly with the maximum headway interval defining a marginally unsafe condition. While these particular delay intervals are now in use, the circuitry incorporates variable components for adjusting these delay intervals to suit any local condition.

In operation, the timing delay circuits 120 and 140 are identical except for the length of the timing delay interval with both receiving the same inputs. With the circuits in an initial quiescent state prior to the arrival of a vehicle, the flip-flop arrangements are in the Reset state with the upper NOR gates 122 and 142 producing True level outputs and the outputs of the lower cross coupled NOR gates 124 and 144 being at the False level. Each time the arrival of a vehicle is sensed, the True output level from the NOR gate 88 of the input circuit 84 is applied to the Reset inputs of the timing delay circuits 120 and 140 to insure that they are in the Reset state prior to the initiation of their timing cycles. On the other hand, if a Reset input is received during its respective timing cycle, the circuit 120 or 140 is returned to its Reset state to produce a True output from its respective output NOR gate 130 or 150. The Set input of the timing delay circuits 120 and 140 receives the logic level signals from the output NOR gate 118 in the first timing delay circuit 100 which goes to the False level upon arrival of a vehicle and does not return to the True level until completion of the 0.2 second delay cycle after sensing departure of a vehicle. Upon completion of the 0.2 second delay interval by the circuit 100, the transition from the False to the True level at the Set input of the timing delay circuits 120 and 140 constitutes a positive going signal capable of passing the differentiator limiters 126 and 146 to apply a True input level to one input of the respective cross coupled NOR gate 122 and 142 causing its output to go to the False level, thus placing both flip-flop arrangements in their Set state. This initiates the timing cycles of the delay inverters 132 and 152, which upon completion will apply a True level to the other cross coupled NOR gate 124 or 144 to return the flip-flop arrangement to its Reset state. At the same time a False level signal is applied to one input of the output NOR gates 130 and 150 to enable them during the delay cycle to generate a True output should another vehicle arrive during the delay cycle to return the other input being received from the output NOR gate 118 to the False level.

In this regard, it should be noted that the True output from the NOR gate 88 in the input circuit 84 indicating arrival of a vehicle passes through diode 92 without delay to the input of the output NOR gate 118 so that it is applied to the other input of the output NOR gates 130 and 150 without delay. On the other hand, the delay circuits 128 and 148 delay the application of the True level signal from the NOR gate 88 output to the Reset inputs of the timing delay circuits 120 and 140 to postpone switching of the flip-flop arrangements back to their Reset state a sufficient interval to insure that False level signals will be applied simultaneously to both inputs of the output NOR gates 130 and 150, at least momentarily, to produce a True level output, when the timing delay circuit is still in its Set state before completing its timing cycle. If the arrival of another vehicle is not sensed during the respective timing interval, the delay inverter 132 or 152, or both, complete their delay cycle to deliver a True output signal upon completion to one of the inputs for the NOR gate 124 or 144, thus automatically returning the circuit 120 or 140 to its Reset state.

In the particular arrangement shown in FIG. 5, if the arrival of another vehicle is sensed during the shorter illegal interval, in this case 0.5 second, established by the delay inverter 132 of the timing delay circuit 120, then brief True output pulses are produced by the output NOR gates 130 and 150 of both timing delay circuits. These output pulses are positive going and each is applied to the Set input of a respective additional timing delay circuit 170 and 190 which operates an appropriate counter or indicator device. As previously described in connection with the other timing delay circuits, the positive going input signal applied to the Set input is passed by a differentiator circuit 176 to be applied as a True level input to a NOR gate 172 switching the state of the flip-flop arrangement provided by cross coupling with another NOR gate 174. The Reset input at one input of the NOR gate 174 is simply connected through its delay circuit 178 to ground potential to maintain a False level, so that the timing delay circuit 170 is returned to its Reset state only upon completion of its timing cycle determined by the duration of the delay interval provided by a "violation" delay inverter 182. The duration of this timing cycle interval for the delay timing circuits 170 and 190 is selected to maintain a visible or audible violation or "danger" indication for a desired interval, such as may be provided by a roadside sign installation 20 as shown in FIG. 1, typically for approximately one second to alert an offending motorist or traffic official. Of course, other types of timing arrangements might be employed for this simple purpose.

In order to prevent both a violation and a danger indication when the arrival of a second vehicle occurs within the violation delay interval, the output of the NOR gate 174 from the timing delay circuit 170 is coupled to the Reset input of the timing delay circuit 190. Thus, when the circuit 170 is placed in its Set state by an output pulse from the output NOR gate 130, the resulting True output from the lower NOR gate 174 of the cross coupled flip-flop pair is applied to maintain the timing delay circuit 190 in its Reset state. This Reset input signal is delivered through a Reset input delay circuit 198 to one input of the lower cross coupled NOR gate 194, thus holding its output at the False level. On the other hand, assuming that the arrival of the vehicle is sensed after completion of the 0.5 second violation interval established by the timing delay circuit 120, but before completion of the longer 1.0 second danger interval of circuit 140, no output pulse is produced by the output NOR gate 130, and the timing delay circuit 170 thus remains in its Reset state. since the danger interval is not yet completed, an output pulse would be generated only by output NOR gate 150 to be applied to the input of the upper NOR gate 192 through its differentiating and limiter circuit 196. Since in this case the True level signal is absent from the Reset input of the timing delay circuit 190, it is switched to its Set state to begin a timing cycle with the danger delay inverter 202, which upon completion delivers a True level signal to the input of the lower NOR gate 194 to restore the Reset state.

Figure 7:
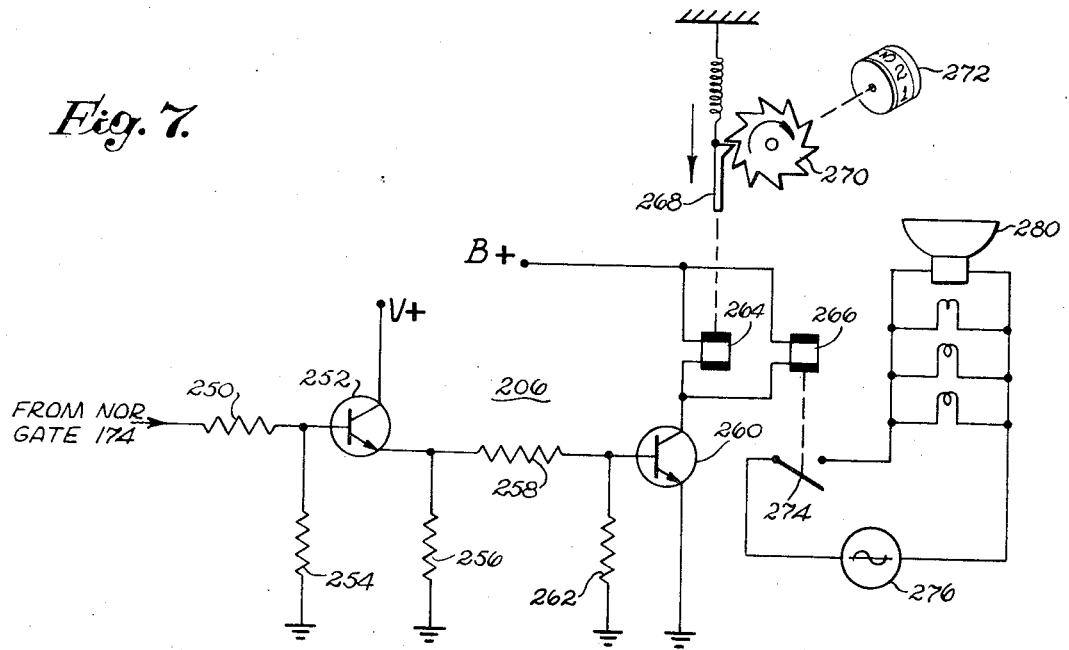
FIG. 7 illustrates the power drive circuit.

As shown in the embodiment illustrated in FIG. 5, a "total" counter drive 204, a violation counter and indicator driver 206, and a danger counter and indicator drive 208 are coupled to receive the outputs from the timing delay circuits 100, 170 and 190. Each of these constitutes a power drive circuit, as shown in detail in FIG. 7, for delivering operating power to actuate a counter, indicator lights, an audible warning device, or the like, as may be desired. Each of these circuits, as hereinafter described in connection with FIG. 7, is responsive to a True level appearing on their respective inputs.

The input to the total counter driver 204 is applied from the output of an output NOR gate 180 that may be included as a part of the printed circuit card containing the timing delay circuit 170. This output NOR gate 180 receives only one input from the output NOR gate 118 in the first timing delay circuit 100. Thus, the total counter drive 204 receives a True level actuating signal applied to its input only when no vehicle is present, and once interrupted by the arrival of a vehicle, the input does not return to the True level until the minimum interval timing delay circuit completes its full cycle. Whatever the form of counter employed, a complete cycle of operation for registering the passage of a single vehicle requires actuation and deactuation of the driver 204 so that the vehicle count is not advanced until the actual trailing edge passes. This eliminates erroneous counting of each segmented portion of a single vehicle, such as a tandem trailer rig. The input to the violation counter and indicator driver 206 is applied from the output of the lower cross coupled NOR gate 174 in the timing delay circuit 170. This output is switched to the True level to actuate the violation counter and indicator upon arrival of a vehicle that is following at an illegal interval and remains at the True level during the entire timing cycle of the violation delay inverter 182. Similarly, the danger counter and indicator driver 208 receives a True level input upon arrival of the vehicle following at an unsafe, but not illegal, distance, and the True level is maintained to keep the driver 208 actuated during the entire timing cycle of the danger delay 202.

Figure 6:
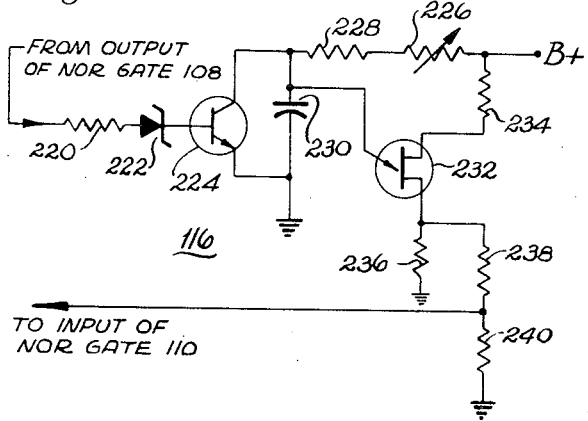
FIG. 6 illustrates a form of the delay inverter circuit.

Referring now to FIG. 6, a preferred form of delay inverter circuit, which may be used in each of the delay timing circuits in the system is specifically illustrated in relation to the 0.2 second delay inverter 116 of the delay timing circuit 100. The output of the upper cross coupled NOR gate 108 is coupled through an input resistor 220 and through a diode 222 connected in the forward direction to the base of an NPN switching transistor 224. A positive B+ operating voltage, typically pulse 15 volts, is supplied through a series connected variable resistor 226 and a fixed resistor 228 to the collector terminal of the transistor 224 that has its emitter coupled to ground. With the output from the NOR gate 108 at its normal True level of approximately 4.5 volts positive when the flip-flop arrangement of the delay timing circuit 100 is in its Reset state prior to the initiation of a timing cycle, the transistor 224 conducts in saturation to provide a low resistance shunt across a timing capacitor 230, which is coupled in parallel across its collector and emitter. This bypasses the current from the B+ source flowing through the series connected resistors 226 and 228 to ground to prevent charging of the capacitor 230. When the output of NOR gate 108 is switched to a False level upon detection of the trailing edge of a vehicle, or its equivalent, the False level at zero or ground potential is applied to the base of the transistor 224 cutting it off thus removing the shunt and allowing the current flow through the resistors 226 and 228 to charge the capacitor 230. As the capacitor 230 charges, the voltage across it gradually increases towards the B+ level at a rate determined by the R-C time constant resulting from the combined resistance value of the resistors 226 and 228 and the capacitance value of the capacitor 230. The variable resistor 226 is preferably provided with a manual adjustment easily accessible at the edge of the printed circuit card containing the timing delay circuit components so that, after installation in a conventional type of rack assembly within the control box 18, a desired precise timing interval can be set by comparison with an external precision clock, and the same can be achieved with each of the other timing delay circuits. For the 0.2 second interval specified for the delay inverter 116, for example, the capacitor 230 might have a value of 4.75 microfarads with a fixed resistor 228 of 10 kilohms and a variable resistor having a maximum value of 50 kilohms. For the longer delay intervals of 0.5 and 1.0 second, a capacitor of 10 microfarads might be employed with a variable resistor having a 50 kilohm maximum and fixed resistors of 33 kilohms and 37 kilohms, respectively. This will permit the respective delay intervals to be varied as desired to suit any particular application or standard.

The voltage developed across the capacitor 230 is applied to the base terminal of a unijunction transistor 232 that has its collector coupled to the B+ operating supply through a low value resistor 234 and its emitter coupled to ground through another low value resistor 236. The value of the resistors 234 and 236, typically 470 and 100 ohms, respectively, determine the base voltage at which the unijunction transistor 232 switches from its normally nonconductive state with the capacitor 230 uncharged to its fully conductive state, which preferably is selected in the linear portion of the charging cycle. When the unijunction transistor 232 switches to its conductive state at the end of the timing cycle, which in this case is 0.2 second, a voltage is developed across its emitter resistor 236 to be applied as an input across a pair of series connected resistors 238 and 240 operating as a voltage divider to develop a proper True level signal at the common output terminal between them to be applied as the delay inverter output to the input of the lower flip-flop connected NOR gate 110, thus restoring the timing delay circuit 100 to its previous Reset state. When the timing delay circuit is restored to its Reset state, either upon completion of the timing cycle or upon arrival of an additional vehicle before the end of the timing cycle, the normal True output from the NOR gate 108 is restored to be applied to the base of the switching transistor 224 causing it to conduct in saturation discharging the capacitor 230 and reestablishing the shunt across it to prevent further charging.

Referring now to FIG. 7, a preferred form of driver circuit for receiving the logic output from the timing delay circuitry is shown particularly in relation to the violation counter and indicator driver 206. In this instance, the input is applied from NOR gate 174 through a base current limiting input resistor 250 to the base of a first stage NPN switching transistor 252, its base being also connected to ground potential through a higher valued resistor 254. The collector of switching transistor 252 is connected to a V+ source of positive operating potential, typically 5 volts, and its emitter is coupled to ground through an output resistor 256. The signal developed across the output resistor 256 is applied through a low valued base current limiting input resistor 258 to the base terminal of an NPN power switching transistor 260, its base also being connected to ground through a resistor 262. Thus, the switching transistor operates in an emitter follower mode to supply an input with the appropriate impedance match from the output of the NOR gate 174 to the base of the power switching transistor 260. The emitter of the power switching transistor 260 is coupled directly to ground potential, and its collector is coupled through a pair of solenoid operating coils 264 and 266 to a source of B+ operating potential, typically at a positive fifteen volts.

In operation, when the output received from the NOR gate 174 is at its normal False or zero voltage level, transistor 252 is cut off so that the signal developed at the base of the power switching transistor 260 is also low to hold it at cutoff. On the other hand, when the output received from the NOR gate 174 is raised to the True level, in this case indicating the occurrence of a violation, the transistor 252 conducts to deliver base current to the power switching transistor 260 causing it to conduct, thereby allowing actuating current from the B+ source to flow through the solenoid coils 264 and 266 to operate the counter and indicator.

As shown schematically, the solenoid coil 264 may be associated with a simple decimal counter arrangement in which a spring biased pawl 268 upon actuation is pulled in with the solenoid armature to be positioned to engage the next of the 10 teeth provided on the rachet wheel 270. Then, when the solenoid coil 264 is deactuated, the spring bias returns the pawl 268 to its original position causing it to engage the next tooth on the rachet wheel 270 to rotate a unit indicator drum 272 one position, thus increasing the indicated decimal count by one. The other solenoid coil 266 has its armature mechanically coupled to close a normally open switch contact 274 completing the circuit from a source of AC line voltage 276 to a bank of indicator lights 278 to turn them on so as to backlight or otherwise illuminate a visual violation indicator, such as illustrated in FIG. 1 by the sign 20, and also deliver AC power to operate an audible signal such as a horn 280. The lights and horn remain actuated for the period of time selected for the violation delay interval provided by the timing delay circuit 170.

As will be apparent to those skilled in the art, the particular logic and gating circuitry shown and described herein though illustrative of the preferred embodiment constitutes only one of many ways in which the particular timing functions and relationships may be accomplished. For example, the use of more conventional AND and OR logic elements, and even elementary solenoid switching can be used to provide the necessary timing and gating functions. Also, the specific time intervals given herein are for purposes of illustration, in accordance with current practice, and these may be varied as may prove desirable based on practical knowledge gained for actual experience in the operation of such systems.

What is claimed is:

1. A system for detecting and indicating that the headway interval between successive vehicles in a common traffic lane is less than a predetermined minimum safe headway interval, comprising:

vehicle detector means responsive to the presence of a vehicle at a given point along said traffic lane for producing a detector signal during presence of a vehicle at said given point;

first timing means responsive to the signal from said detector means for producing a first output condition for a predetermined minimum time interval beginning with each cessation of said detector signal;

second timing means responsive to the detector signal from said detection means for generating a second output condition defining an unsafe time interval after cessation of a signal from said vehicle detector means indicative of a headway interval less than said predetermined minimum safe headway interval; and, output signaling means responsive to the detector signal from said detection means and to said first and second output conditions for indicating an unsafe condition whenever a signal from said vehicle detection means is initiated during said unsafe time interval but after said minimum time interval.

2. The system of claim 1 wherein:

said first timing means includes means for generating a trigger signal for actuating said second timing means at the conclusion of each predetermined minimum time interval and for preventing generation of said trigger signal upon a subsequent initiation of said detector signal before conclusion of said predetermined minimum time interval;

said second timing means being responsive to the generation of said trigger signal for generating said second output condition only during an unsafe time interval following said predetermined minimum time interval; and, said output signaling means having a first coincidence means responsive to the initiation of said detector signal and to said second output condition for indicating said unsafe condition.

3. The system of claim 2 wherein:

said predetermined minimum time interval is approximately 0.2 second and said unsafe time interval following said minimum time interval is in the range from approximately 0.5 second to 1.0 second.

4. The system of claim 2 wherein:

said second timing means for generating said second output condition further comprises third timing means for generating in response to said trigger signal a third output condition during only that initial portion of said unsafe time interval indicative of a shorter illegal headway interval of shorter time duration than said unsafe time interval; and, said coincidence means constitutes a second coincidence circuit responsive to said third output condition and to initiation of said detector signal only during said initial portion of said unsafe time interval for indicating an illegal headway interval, said first coincidence means being also responsive to said third output condition for preventing indication of an unsafe headway interval until conclusion of said initial portion of said unsafe time interval.

5. The system of claim 1, wherein:
said vehicle detector means includes means for transmitting a narrow beam of radiant energy in a path to intersect said given point along said traffic lane and receiving means responsive to impingement of said beam for generating said detector signal when presence of a vehicle at said given point interrupts the transmission of said narrow beam in said path.

6. In a system for detecting and indicating an unsafe headway interval between successive vehicles in a common traffic lane, wherein an unsafe driving condition is indicated when presence of a later arriving vehicle is detected within a predetermined unsafe time interval following departure of a previous vehicle, the improvement comprising:

timing delay means having set and reset states, including input means responsive to detection of the departure of each vehicle from said given point for switching said timing delay means to said set state and to the presence of a vehicle at said given point for placing it in said reset state, a delay circuit operative during said set state to generate a trigger signal for returning said timing delay means to its reset state upon completion of a timing cycle having a duration equal to a predetermined minimum time interval; and, means actuated by said trigger signal to respond to detection of the later arrival of a vehicle during said unsafe interval indicating said unsafe condition only after completion of said predetermined minimum time interval following departure of each vehicle.

7. The improvement of claim 6 wherein:
said actuated means comprises additional timing delay means having set and reset states including first input means responsive to said trigger signal to be placed in said set state and second input means responsive to the presence of a vehicle to be placed in said reset state, and an unsafe timing delay circuit operative during said set state to generate a reset timing signal upon completion of said timing cycle for returning said additional timing delay means to its reset state, said timing cycle having a duration equal to said predetermined unsafe time interval, and output means actuated only during said set state to respond to detection of the presence of a vehicle prior to completion of each unsafe timing cycle for generating an output signal indicative of said unsafe condition.

8. The improvement of claim 7 wherein:
said minimum time interval is approximately 0.2 second; and,
said unsafe time interval is in the range from approximately 0.5 to 1.0 second.

9. The improvement of claim 7 further comprising:
detection means coupled to said input means of said timing delay means for generating detection signals indicative of the presence or absence of a vehicle at a given point along said common traffic lane, said detection means including means for transmitting a narrow beam of radiant energy in a path to intersect said given point and receiving means responsive to impingement of said beam for generating said detection signals in accordance with whether a vehicle is present at said given point to interrupt transmission of said beam along said path.

10. An improved system for detecting and registering the passage of vehicles past a given point in a roadway comprising:

vehicle detection means including a transmitter for directing a narrow beam of radiant energy in a path to intersect said given point and a receiver located in the path of said beam for responding to impingement of said beam for generating detection signals whereby a vehicle present at said given point interrupts said beam to prevent its impinging on said receiver;

timing means responsive to detection signals from said detector means for producing a first output condition for a predetermined minimum time interval following the initial impingement of said beam on said receiver after each interruption; and, register means responsive to said detection signals generated by said detection means upon each interruption of said beam and to said first output condition of said timing means for registering the passage of a single vehicle only when said beam is not interrupted during said predetermined minimum time interval.

11. An improved system for detecting the headway interval between vehicles passing a given point in a roadway comprising:

vehicle detection means including a transmitter for directing a narrow beam of radiant energy in a path to intersect said given point and a receiver located in the path of said beam for generating detection signals in response to impingement of said beam, whereby a vehicle present at said given point interrupts said beam to prevent its impinging on said receiver;

first timing means responsive to said detection signals for producing a first output condition for a predetermined minimum time interval following initial impingement of said beam on said receiver after each interruption;

means responsive to said first output condition and to said detection signals for generating an output indicative of the relative magnitude of the headway interval between each two successive vehicles in the roadway.

12. An improved method for determining whether or not a safe driving spacing exists between two successive moving vehicles comprising:

directing a narrow beam of radiant energy in a path from a transmitter to a receiver to intersect a given point in the roadway to be interrupted by the presence of a vehicle;

signaling the interruption of the beam by the presence of a passing vehicle;

signaling the reestablishment of said beam along said path;

establishing in response to the signaling of the reestablishment of said beam a predetermined minimum time interval following said reestablishment;

identifying whether the signaling of the interruption of the beam occurs during said minimum time interval and signaling the completion of said minimum time interval without interruption of said beam;

establishing in response to the signaling of the completion of said minimum time interval without interruption of said beam a predetermined unsafe time interval following said minimum time interval; and, identifying whether interruption of the beam occurs during said predetermined unsafe time interval to indicate that the spacing between two successive vehicles in the roadway is not safe.

13. The improved method of claim 12 further comprising:

establishing, in response to the signaling of the completion of said minimum time interval without interruption of said beam, a predetermined illegal time interval following said minimum time interval and having a duration substantially shorter than said predetermined unsafe time interval; and, identifying whether interruption of the beam occurs during said predetermined illegal time interval to indicate that the spacing between two successive vehicles in the roadway consitutes an illegal reckless driving condition.

14. An improved method for detecting and registering the passage of the front and rear of each vehicle past a given point in the roadway comprising:

directing a narrow beam of radiant energy in a path to intersect said given point in the roadway to be interrupted by the presence of a vehicle;

signaling interruption of the beam by the presence of a passing vehicle;

signaling reestablishment of said beam along said path after each interruption;

establishing in response to said signaling a predetermined minimum time interval following reestablishment;

identifying whether signaling a later interruption of the beam occurs during said minimum time interval; and, registering the passage of a vehicle only when a later interruption of said beam does not occur during said minimum time interval.

* * * * *